Aug. 26, 1969

L. G. FETERL 3,463,314

GRAIN CLEANING MECHANISM

Filed May 13, 1968

INVENTOR.
Leon G. Feterl
BY Williamson, Palmatier
& Bains
ATTORNEY

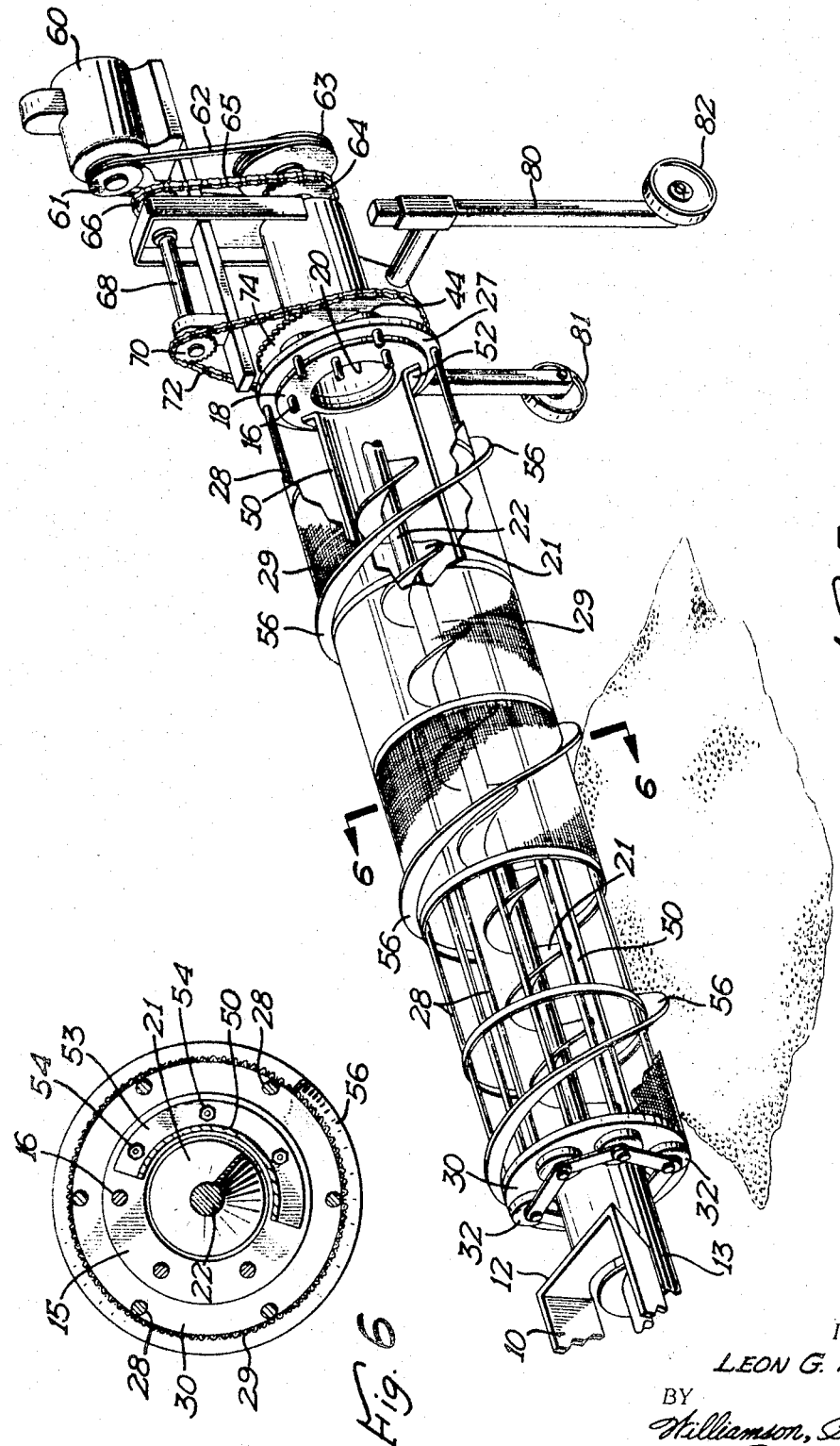

United States Patent Office 3,463,314
Patented Aug. 26, 1969

3,463,314
GRAIN CLEANING MECHANISM
Leon G. Feterl, Salem, S. Dak. 57058
Continuation-in-part of application Ser. No. 630,329,
Apr. 12, 1967. This application May 13, 1968, Ser.
No. 728,559
Int. Cl. B07b 1/18
U.S. Cl. 209—284                                    4 Claims

ABSTRACT OF THE DISCLOSURE

Grain cleaning apparatus having a rotary separating screen of cylindrical shape, an auger conveyor extending longitudinally within the screen, and a baffle element in the form of a segment of a cylinder positioned between the separator screen and the auger conveyor and partially enclosing the conveyor. The baffle serves to contain and guide particles of grain and distribute them evenly over the length of the separator screen.

This application is a continuation-in-part of application Ser. No. 630,329, filed Apr. 12, 1967, in the name of Leon G. Feterl, and now abandoned.

Grain that has been processed by a threshing machine frequently contains undesired foreign particles such as weed seeds, chaff, broken kernels and other foreign particles which it is very desirable to remove prior to storing the grain in silos for use or sale. Trash and broken kernels interfere with air flow when the grain is being dried and stored and cause areas of spoiled grain. Also, trapped kernels invite organisms, and weevils, thereby speeding spoilage and deterioration of the stored grain.

My unique grain cleaning apparatus effectively removes undesired foreign particles from grain, thereby precluding the aforesaid disadvantages, by virtue of an arrangement particularly characterized by a rotary, cylindrical screen and an auger conveyor extending longitudinally within the screen, the conveyor being spaced inwardly from the screen by a substantial distance so as to preclude the forcing of relatively large granular particles into the openings in the screen and thereby blocking the screen.

A particularly advantageous feature of my invention resides in the utilization of an elongate baffle member disposed in the space between the auger conveyor and the screen and enclosing only a portion of the conveyor. The curved baffle cooperates with the auger to insure the continuous movement of grain through the separating screen and prevent the undesired accumulation of a relatively large amount of grain in the screen and the consequent blocking of the screen openings through which the fine, foreign particles are intended to be discharged.

As a further beneficial aspect of my invention, I utilize a conveyor element mounted on the outside of the separating screen and rotatable therewith, the external conveyor element functioning to clear away separated foreign particles which tend to accumulate adjacent the outside surface of the rotating screen.

These and other objects and advantages of my invention will become readily apparent as the following description is read in conjunction with the accompanying drawings wherein like reference numerals have been used to designate like elements throughout the several views, and wherein:

FIGURE 5 is a perspective view of my improved separator unit; and

FIGURE 6 is a vertical section view taken along lines 6—6 of FIGURE 5.

Figure 1:
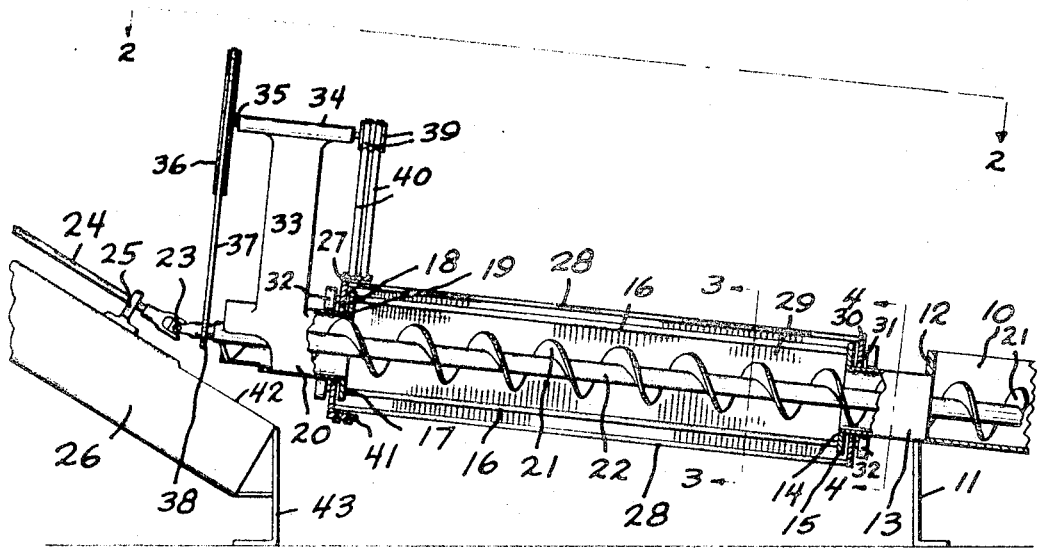
FIGURE 1 is a side elevation view of my separator unit, partially in section.

The grain cleaning apparatus of this invention has been particularly designed with a view towards effectively separating undesired foreign matter from grain as it is being conveyed from a supply hopper to a silo or other storage container. To this end, I employ as my separating device a rotary, generally cylindrical separator having a plurality of relatively small openings therein of a predetermined size. Although the separator could be constructed from perforated sheet metal, I prefer to use a cylindrical screen having openings particularly sized for the type of grain being processed. The mesh size of the screen must be such as to permit the fine, foreign particles to pass therethrough and contain the relatively larger sized grain particles which are to be retained and stored. Virtually any grain, such as large or small kernel corn, soy beans, wheat, barley and oats, may be purged of foreign material by being conveyed through my rotary, cleaning apparatus.

FIGURES 1 through 4 illustrate a preferred form of my invention wherein the cleaning apparatus is utilized to clean grain as it is being conveyed from a supply hopper 10 to a portable elevator 26. Supply hopper 10 is supported from the ground by means of a bracket 11, and has an opening in wall 12 thereof within which tubular section 13 is secured. A stationary ring or annular member 15 is attached at 14 to one end of conduit section 13, annular plate or ring 15 being connected by rods 16 to a similarly shaped annular member 18 at points 17. Annular plate 18 is supported on the inner end of tubular section 20 at 19. Extending between tubular sections 13 and 20 is a helical conveyor 21 of the auger type projecting at one end into hopper 10. Helicoid conveyor 21 is mounted on shaft 22 which is secured at one end to universal joint 23 connected to drive shaft 24. Shaft 24 is connected to a rotary power source and is supported at its lower end within bearing 25 mounted on conveyor or elevator housing 26 supported on stand 43. A conveying or elevating member, preferably in the form of an auger, is enclosed within housing 26 and is positioned at its upper end within a silo or other grain-collecting bin. The conveyor within housing 26 may also be driven from shaft 24.

Figure 3:
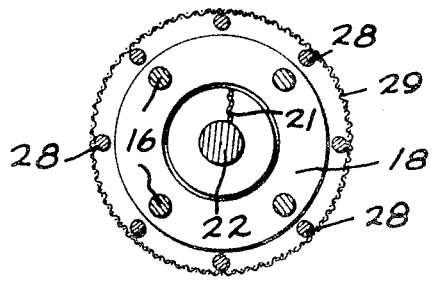
FIGURE 3 is an enlarged section view taken along lines 3—3 of FIGURE 1.
Figure 4:
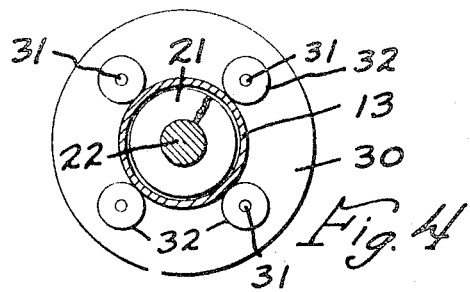
FIGURE 4 is a vertical section view taken along lines 4—4 of FIGURE 1.

Auger conveyor 21 is positioned longitudinally within a generally cylindrically shaped separator screen 29 supported on elongated rods 28 in the manner best shown in FIGURE 3. Rods 28 are secured at their opposite ends to a second set of annular plates 27 and 30 which have a slightly greater inner diameter than tubular sections 13 and 20 around which they rotate. The entire screen assembly is rotatably supported on tubular sections 13 and 20 by means of rollers 32 mounted on stub shafts 31 extending from annular plates 27 and 30.

Figure 2:
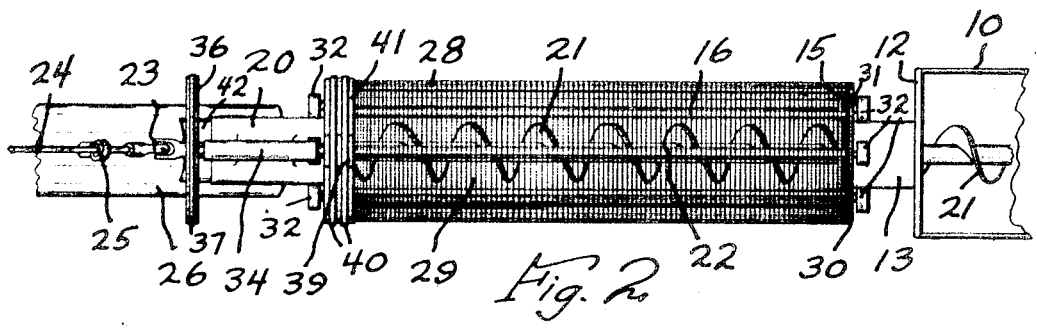
FIGURE 2 is a top, plan view of the apparatus of FIGURE 1 as veiwed along lines 2—2.

In the embodiment of my invention shown in FIGURES 1 and 2, rotary motion is imparted to screen 29 by pulley wheels or sheaves 41 attached to end plate 27 and driven by belts 40 extending around drive pulleys 39 mounted on shaft 35. Bearing support for shaft 35 is provided by elongated bearing member 34 mounted on bracket arm 33 extending upwardly from tubular section 20. Relatively large pulley wheel 36 is affixed to the forward end of shaft 35 and is driven by belt 37 from small drive sheave 38 supported on auger shaft 22. Those skilled in the art will readily appreciate that the relatively large size of pulley wheel 36 will cause shaft 35 and screen sheaves 41 connected thereto by belts 40 to rotate at a considerably slower speed than auger conveyor 21. The pulley wheels and sheaves are so sized that auger shaft 22 will rotate at a speed from two and one half to four times the speed of screen 29. Auger 21 will normally rotate at a speed of approximately 60 r.p.m. and screen 29 may rotate within a speed range of from 180 to 250 r.p.m.

It is to be noted with respect to the arrangement shown in FIGURES 1 through 4 that drive shaft 24 supplies rotary power to both auger 21 and rotary screen 29, universal joint 23 permitting relative angular adjustment of screen 29 with respect to conveyor housing 26. For varying conditions of operation and grain types, screen 29 can be pitched at the desired angle to provide the desired movement of grain therethrough and the proper separating action.

It will be readily apparent that as auger 21 rotates relative to surrounding separating screen 29, it will convey grain from supply hopper 10 longitudinally through rotating screen 29 into discharge tube 20, the forward, lower end of which is cut away at 45 to permit the free flow of grain into opening 42 at the top of conveyor housing 26. Since auger conveyor 21 would tend to throw large as well as small grain particles radially outwardly towards screen 29 as it rotates, and would force large granules into the openings in screen 29 if disposed too close thereto, auger 21 is sized so that its outer periphery will be spaced inwardly from the surrounding surface of screen 29. As appears most clearly in FIGURE 3, auger 21 is of such a diameter that peripheral surface 21a of its impeller blades is spaced from screen 29 by a distance $x$ of sufficient magnitude that there will be no danger of helicoid 21 forcing large grain particles into the openings of screen 29 and thereby blocking the outward flow of fine, foreign particles. With shaft 22 of auger 21 disposed concentrically within screen 29 in the manner shown in FIGURE 3, an annular clearance space of uniform radial width $x$ will be provided between the periphery of auger 21 and screen 29. Clearance dimension $x$ is preferably at least as great as one quarter of the diameter of auger 21 and may be as great as one half of the auger diameter.

In operation, grain will be poured into hopper 10 and rotary power will be imparted to auger 21 and screen 29 through drive shaft 24. As auger conveyor 21 rotates relative to revolving screen 29, it will carry the grain into cylindrical screening member 29 where the grain and foreign particles in admixture therewith will be subjected to a separating action by the tumbling effect of revolving screen 29. In addition to providing structural support, elongate rods 16 act as turbulators to impart an added turbulence to the grain particles within screen 29. The gentle action of auger conveyor 21 moves the grain longitudinally through screen 29 while the more slowly revolving screen 29 simultaneously provides a continuous tumbling effect to assure that all of the grain is exposed to the screen area many times during the course of its movement from supply hopper 10 to discharge conduit 20 by auger 21. As screen 29 revolves, the undesired, fine foreign particles such as chaff, weed seeds and broken kernels will drop downwardly through the openings therein onto the ground. If desired, a collecting trough may be provided underneath screen 29. The larger, full-size grain particles which are desired to be retained are propelled on through screen 29 by auger 21 into elevator 26 by means of which they are conveyed to a storage silo.

In FIGURES 5 and 6, I have shown a modified form of my grain cleaning apparatus incorporating certain features which have been found to substantially improve the separating action. The basic components including a cylindrical separator in the form of a screen 29 and an internal auger conveyor 21 are shown in the same basic arrangement as in FIGURES 1 through 4. In the arrangement shown in FIGURES 5 and 6 I have added an elongate baffle element 50 which extends longitudinally within the clearance space between screen 29 and auger conveyor 21. As may be seen most clearly in FIGURE 6, baffle 50 is of curvilinear cross section and is disposed in close proximity to the peripheral surface of helicoid 21. The curvature of baffle 50 preferably conforms to the peripheral curvature of the impeller blades of conveyor 21 as is shown in FIGURE 6. Baffle 50 is provided at its opposite ends with flanges 52 and 53 which are secured to stationary collars or annular rings 15 and 18 as by bolts 54 or by welding. As is clearly indicated in FIGURES 5 and 6, baffle 50 encloses only a portion of the peripheral surface of auger conveyor 21, thereby permitting grain to be propelled from only one side of auger 21 onto surrounding screen 29. Baffle 50 is preferably vertically oriented in the position shown in FIGURES 5 and 6, with the lower end thereof at least partially covering the underside of conveyor 21. By virtue of this arrangement, baffle 50 will act to collect and guide a uniform quantity of grain over the entire length of screen 29. Because baffle 50 will continuously hold a certain amount of the grain being processed through the separator, there will be less grain in contact with screen 29 at any given instant, thereby preventing the accumulation of grain on screen 29 in such amount as to block the screen and prevent the discharge of fine, foreign particles therethrough. Baffle 50 in effect assures that there will be less grain per square inch of surface of screen 29, thus greatly increasing the exposure of the undesired foreign particles to the surface of screen 29 with a concomitant increase in the efficiency of the separator screen. The cooperative relationship between auger 21 and baffle 50 produces a steady, uniform flow of grain through screen 29 with the result that grain will be distributed evenly from the open side of auger 21 over the entire length of screen 29. Thus, by the use of baffle 50 in the aforesaid manner, I achieve the particular advantages of effectively utilizing the entire length of screen 29 as a separator and preventing the undesired massing of large quantities of grain therein.

Also, as auger 21 rotates in the direction indicated by the arrow in FIGURE 6, some of the grain particles carried around by auger 21 will fall over the top edge of baffle 50 back down onto revolving screen 29 in a direction opposite to that in which the main body of grain particles are being carried. This added tumbling effect produced by baffle 50 improves the separating action. Moreover, as auger 21 rotates within baffle 50, grain particles being carried upwardly strike baffle 50 and are redirected downwardly onto screen 29 where they are further screened and separated.

The action of the cleaning apparatus shown in FIGURES 5 and 6 is further improved by mounting conveyor element 56 on the outside of cylindrical separator 29. Conveyor element 56 preferably takes the form of a helical blade wound around the outside of screen 29. As separator screen 29 revolves, conveyor blade 56 rotates therewith and acts to clear away separated foreign particles which tend to accumulate on the ground adjacent screen 29. By moving the accumulating foreign particles away from the underside of screen 29, helical conveyor blade 56 prevents a large pile of foreign particles from piling up and blocking the further discharge of foreign material through screen 29. Conveyor element 56 also performs the useful function of preventing the accumulation of foreign material at the lower end of screen 29 where such an accumulation might interfere with rollers 32 and collect between the rollers and tubular section 13 about which they revolve.

Also shown in FIGURE 5 is a modified direct drive arrangement wherein a motor 60 is mounted directly on the forward end of the cleaning apparatus. This arrangement is in contrast to that shown in FIGURES 1 through 4 wherein a remote power source was utilized to transmit power to the auger 21 and screen 29 through a drive shaft 24. In the arrangement shown in FIGURE 5, auger shaft 22 has a pulley wheel or sheave 63 mounted on the forward end thereof which is driven by a belt 62 extending around pulley 61 mounted on the output shaft of motor 60. Power is transmitted from auger shaft 22 to a jack shaft 68 by a chain and sprocket arrangement comprised of sprocket 64, chain 65 and upper sprocket 66 mounted on shaft 68. Drive sprocket 70 on the rear end of jack shaft 68 drives chain 72 connected around relatively large sprocket wheel 74 which is drivingly connected to annular plate 27 on which screen 29 is rotatably supported. Rollers 44 at the forward end of screen 29 rotatably engage tubular outlet section 20 about which they revolve. The pulley and sprocket wheels are of such a diameter as to provide the desired differential and rotational speed between screen 29 and auger 21.

Although internal auger conveyor 21 has been shown mounted concentrically within screen 29 in the several embodiments of my invention which I have shown and described, it is to be noted that auger shaft 21 could be mounted eccentrically with respect to screen 29. If a particularly large diameter separating screen 29 is being employed, it might be desirable to offset auger shaft 21 towards the bottom of screen 29 below the center thereof, particularly in the arrangement shown in FIGURES 1 through 4 where no internal baffle is employed, to insure the steady, longitudinal movement of grain through the separator screen. Otherwise, an undesirably large amount of grain might accumulate in screen 29 and interfere with its separating action.

I contemplate that various other changes and modifications may be made in the form, details, arrangement and proportions of the various parts without departing from the spirit and scope of my invention as defined by the following claims.

I claim:
1. Grain cleaning apparatus comprising:
a rotatably mounted screening member of generally cylindrical configuration having a plurality of openings of predetermined size therein;
a rotatably supported, helicoid conveyor disposed longitudinally within said screening member and extending continuously between the ends thereof;
an elongated baffle element positioned between said helicoid conveyor and said screening member and extending continuously between the ends thereof, said baffle element being in the form of a segment of a cylinder of substantially uniform circumference throughout its length circumscribing only a portion of the periphery of said helicoid conveyor and having a portion thereof underlying said helicoid conveyor to contain and guide grain particles, thereby providing a uniform opening along the length of said conveyor through which grain particles may be distributed evenly onto said screening member over its entire length; and
power means operative to rotate said screening member and said helicoid conveyor.

2. Grain cleaning apparatus as defined in claim 1 wherein:
said baffle element extends circumferentially from a point under said conveyor upwardly around only one side thereof, thereby providing said opening along the opposite side of said conveyor.

3. Grain cleaning apparatus as defined in claim 2 wherein:
said baffle element terminates at its upper edge at a point below the top of said conveyor on said one side thereof; and
said conveyor rotates upwardly along said baffle in a direction from the bottom towards the top thereof whereby particulate matter being separated is carried upwardly along said baffle by said conveyor with a portion thereof falling downwardly over said baffle to produce desirable tumbling and agitation of the particles within said screening member.

4. Grain cleaning apparatus as defined in claim 1 wherein:
said helicoid conveyor is rotatably supported independently of said screening member and has its peripheral surface spaced inwardly therefrom; and
further including a second conveyor affixed to the outside of said screening member for rotation therewith, said second conveyor serving to move separated foreign particles away from the space immediately adjacent the outside of said screening member.

References Cited

UNITED STATES PATENTS

| | | | |
|---|---|---|---|
| 651,022 | 6/1900 | Sterling | 209—298 X |
| 1,007,119 | 10/1911 | Lee | 209—284 |
| 1,472,204 | 10/1923 | Brewer | 209—284 |
| 1,533,997 | 4/1925 | Stinson | 209—284 |
| 1,843,404 | 2/1932 | Rasmussen | 209—421 X |
| 2,842,266 | 7/1958 | Carlson | 209—284 |
| 2,985,302 | 5/1961 | Brands | 209—284 X |
| 3,373,871 | 3/1968 | Huether | 209—296 X |

TIM R. MILES, Primary Examiner

U.S. Cl. X.R.
209—296, 420